United States Patent
Johnson et al.

(10) Patent No.: US 9,409,654 B2
(45) Date of Patent: Aug. 9, 2016

(54) SYSTEM AND METHOD FOR IMPROVED LOW AIRSPEED WARNING

(71) Applicant: HONEYWELL INTERNATIONAL INC., Morristown, NJ (US)

(72) Inventors: Steve Johnson, North Bend, WA (US); Yasuo Ishihara, Kirkland, WA (US); Charles Donald Bateman, Bellevue, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 190 days.

(21) Appl. No.: 14/265,723

(22) Filed: Apr. 30, 2014

(65) Prior Publication Data

US 2015/0314884 A1   Nov. 5, 2015

(51) Int. Cl.
*B64D 45/00* (2006.01)
*B64D 43/02* (2006.01)

(52) U.S. Cl.
CPC ............... *B64D 45/00* (2013.01); *B64D 43/02* (2013.01)

(58) Field of Classification Search
CPC ............................... B64D 43/02; B64D 45/00
See application file for complete search history.

(56) References Cited

U.S. PATENT DOCUMENTS

| | | | |
|---|---|---|---|
| 4,965,572 A * | 10/1990 | Adamson | G01S 17/95 340/963 |
| 5,220,322 A | 6/1993 | Bateman et al. | |
| 5,225,829 A | 7/1993 | Bateman | |
| 6,169,496 B1 * | 1/2001 | Martin | G05D 1/0072 244/179 |
| 2004/0210355 A1 | 10/2004 | Gaidelis, Jr. et al. | |

FOREIGN PATENT DOCUMENTS

WO    2011078847 A1    6/2011

OTHER PUBLICATIONS

Extended EP Search Report for EP 15163939.0-1754; dated Nov. 9, 2015.
Fabre-Raimbault, N. et al.; Low Energy Awareness Protection on Airbus Fly-By-Wire Aircraft; Low Airspeed Alerting Task Appendix 1; Sep. 16, 2010.

* cited by examiner

*Primary Examiner* — Mussa A Shaawat
(74) *Attorney, Agent, or Firm* — Ingrassia, Fisher & Lorenz, P.C.

(57) ABSTRACT

A method and system are provided for generating a low airspeed warning in an aircraft. This method creates a scale factor that is a factor of engine thrust and aircraft altitude. A low airspeed threshold is determined that varies according to the aircraft altitude with respect to a predetermined altitude band and the engine thrust with respect to a predetermined engine thrust band. A low airspeed alert is generated in response to the determination of the low airspeed threshold. This method provides a pilot with earlier knowledge of low airspeed conditions when the aircraft is in a target altitude band, increasing the pilot's response time and thereby enhancing overall aircraft safety.

17 Claims, 4 Drawing Sheets

SYSTEM AND METHOD FOR IMPROVED LOW AIRSPEED WARNING

TECHNICAL FIELD

Embodiments of the subject matter described herein relate generally to aircraft alert systems and, more particularly, to systems and methods for generating low airspeed warnings.

BACKGROUND

Modern aircraft provide airspeed information to pilots in several ways including, for example, visibly distinguishable regions representing safe and unsafe airspeeds on the airspeed readout portion of an aircraft display graphic. When the airspeed drops to an unsafe level, warnings and alerts are provided. The Federal Aviation Administration (FAA) publishes airworthiness standards for aircraft that require that aircraft safety systems warn pilots of low airspeed conditions when an aircraft begins operating below an identified minimum airspeed (referred to hereinafter as a "low airspeed"). The FAA requires that the low airspeed warning be clearly distinguishable and continue until the low airspeed condition is corrected (14 C.F.R. 25.207).

Pursuant to satisfying FAA safety regulations, traditional aircraft safety systems generally provide the flight crew with aural, visible, and tactile warnings when airspeed drops to a designated low airspeed. The designated low airspeed used to trigger a low airspeed warning is based on a predefined stall speed that is aircraft specific and reflects aircraft characteristics such as wing lift, aircraft weight, wing shape, airfoils, and the like. Minimum operating speeds such as takeoff safety speed, takeoff climb speed, and landing approach speed are also related to stall speed. In addition, a variable known as "stick shaker speed" is related to stall speed. That is, stick shaker speed is an airspeed slightly above stall speed, at which a tactile warning (specifically, causing the entire column to shake) is generated. Stick shaker speed is employed because the natural vibration caused by airflow around the wings at stall speed may not be strong enough itself to provide an effective warning that the aircraft is approaching stall speed.

Traditional aircraft warning systems utilize a scale factor to modify a combination of the stick shaker speed and an aircraft minimum operating speed to generate a low airspeed alert. The scale factor represents a safety margin, and the result of the modification is a low airspeed warning that occurs slightly ahead of the stick shaker speed, providing a pilot with time to respond to the low airspeed condition by increasing engine thrust. However, even when a pilot responds to a low airspeed condition in a timely manner, the low airspeed condition is not corrected until the jet engine reaches the pilot selected engine thrust value, which can be several additional seconds.

Traditional aircraft warning systems employ a constant predetermined scale factor, regardless of altitude data and/or engine thrust data. In a low altitude situation, the response time produced by the traditional aircraft warning systems is significant in terms of pilot cognitive workload and overall safety. Consequently, an increase in response time for low altitude situations is desirable. Thus a system or method for generating a low airspeed warning that provides additional response time in low altitude situations is desired.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A method is provided for generating a low airspeed warning in an aircraft. Engine thrust data and aircraft altitude data are received. A processor determines a low airspeed threshold that is a function of engine thrust when the aircraft altitude is within a predetermined altitude band. A low airspeed alert is generated in response to the determination of the low airspeed threshold.

Another method for generating a low airspeed warning in an aircraft is provided. Engine thrust data and aircraft altitude data are received. The aircraft altitude is compared to a predetermined altitude band. A processor determines a variable scale factor that is a function of altitude and engine thrust. The variable scale factor is used to determine a low airspeed threshold, and a low airspeed alert is generated.

A system for generating a low airspeed warning in an aircraft is also provided. The system includes a first source of engine thrust data and a second source of altitude data; and a processor coupled to the first source and the second source. The processor is configured to (1) receive engine thrust data and altitude data, (2) determine a low airspeed threshold that changes as a function of altitude data and engine thrust data, and (3) generate a low airspeed alert in response to the low airspeed threshold.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

Figure 1:
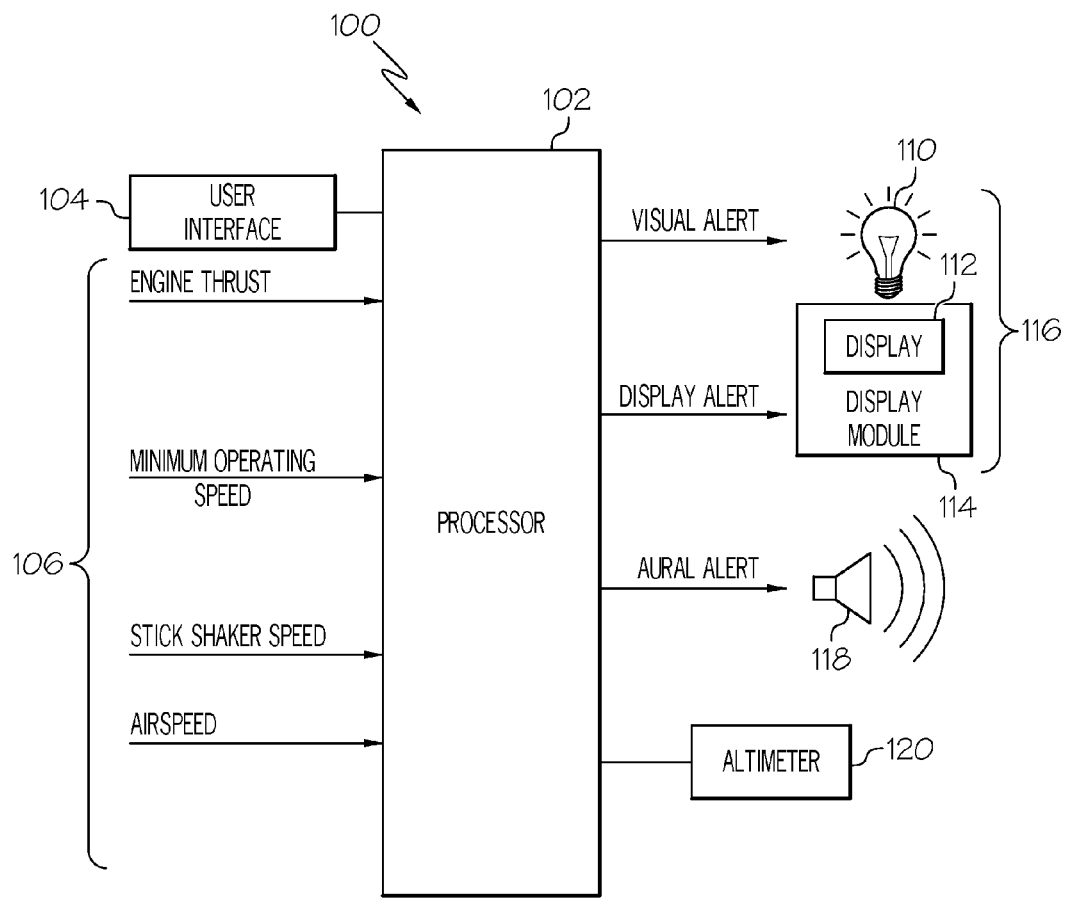
FIG. 1 is a block diagram of an exemplary embodiment of a low airspeed warning system suitable for use in an aircraft.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein is merely an example and serves as a guide for implementing the novel systems and method herein on any user interface in any industrial, commercial, or consumer avionics application. As such, the examples presented herein are intended as non-limiting.

FIG. 1 is a system level block diagram of an exemplary embodiment of a low airspeed warning system 100 suitable for use in an aircraft. For the sake of clarity and brevity, FIG. 1 does not depict the vast number of systems and subsystems that would appear onboard a practical implementation of an aircraft. Instead, FIG. 1 merely depicts some of the notable functional elements and components of the low airspeed warning system 100 that may be included in an aircraft and that support the various features, functions, and operations described in more detail below. Processor 102 is coupled to user interface 104, terrain databases 108, visual alert devices 116, audio alert device 118, and altimeter 120. Visual alert devices 116 include one or more lights 110, and display module 114, which drives display device 112. The processor receives and processes flight navigation signals 106, such as, airspeed, engine thrust, minimum operating speed and stick shaker speed.

The processor 102 may be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, the processor 102 is configured to support various low airspeed processes, operations, and display functions.

In practice, the processor 102 may be realized as an onboard component of an aircraft (e.g., a flight deck control system, a flight management system, or the like), or it may be realized in a portable computing device that is carried onboard the aircraft. For example, the processor 102 could be realized as the central processing unit (CPU) of a laptop computer, a tablet computer, or a handheld device. As another example, the processor 102 could be implemented as the CPU of an electronic flight bag carried by a member of the flight crew or mounted permanently in the aircraft. Electronic flight bags and their operation are explained in documentation available from the United States Federal Aviation Administration (FAA), such as FAA document AC 120-76A.

The processor 102 may include or cooperate with an appropriate amount of memory (not shown), which can be realized as RAM memory, flash memory, EPROM memory, EEPROM memory, registers, a hard disk, a removable disk, a CD-ROM, or any other form of storage medium known in the art. In this regard, the memory can be coupled to the processor 102 such that the processor 102 can read information from, and write information to, the memory. In the alternative, the memory may be integral to the processor 102. In practice, a functional or logical module/component of the system described here might be realized using program code that is maintained in the memory. Moreover, the memory can be used to store data utilized to support the operation of the system, as will become apparent from the following description.

No matter how the processor 102 is specifically implemented, it is in operable communication with the user interface 104, display module 114, light 110, and audio alert device 118. The processor 102 is coupled to receive various types of avionics-related data from the flight navigation signals 106.

For example, the processor 102 supplies appropriate airspeed display commands and low airspeed warnings to the display module 114, and in response, display module 114 selectively renders various types of textual, graphic, and/or iconic information on display device 112. Additionally, processor 102 coordinates data and signals within low airspeed warning system 100 to supply appropriate audio commands to the one or more audio alert devices 118, and in response, the one or more audio alert devices 118 generate aural information in the form of aural alerts, verbal information, sounds, warnings, etc.

Flight navigation signals 106 may be received from external devices or onboard devices such as sensors, implemented using various types of inertial sensors, systems, and/or subsystems, now known or developed in the future, for supplying various types of inertial data, for example, representative of the state of the aircraft including aircraft speed (Indicated airspeed, or IAS), engine thrust data, minimum operating speed and stick shaker speed and altitude data. Altitude data may be obtained by one or more radio altimeters 120 continuously bouncing signals off of the surface of the terrain.

The display module 114, as noted above, in response to commands supplied from the processor 102, selectively renders various textual, graphic, and/or iconic data, and thereby supplies visual feedback to the user. It will be appreciated that the display device 112 may be implemented using any one of numerous known display devices suitable for rendering textual, graphic, and/or iconic information in a format viewable by the user. Non-limiting examples of such display devices include various multifunction displays (MFD), Near to Eye (NTE), projection displays, cathode ray tube (CRT) displays, and flat screen displays such as LCD (liquid crystal display) and TFT (thin film transistor) displays. The display device 112 may additionally be implemented as a screen mounted display, or any one of numerous known technologies. It is additionally noted that the display device 112 may be configured as any one of numerous types of aircraft flight deck displays. For example, it may be configured as a multi-function display, a horizontal situation indicator, a vertical situation indicator, or the like. In the depicted embodiment, however, at least one display device 112 is configured as a primary flight display (PFD).

The user interface 104 may include any combination of one or more of the following: a keypad, touchpad, keyboard, mouse, touchscreen, joystick, knob, microphone, speech or gesture recognition or another suitable device adapted to receive input from a user. Audio alert device 118 may be one or more devices suitable for converting audio data into aural information in the form of warnings, alerts, directions, sounds or verbal information. The audio alert device 118 responds to audio commands by converting audio data into aural information. Audio data may be driven by the processor 102, and may come from any combination of sources coupled to processor 102, such as flight navigation signals 106 and the user interface 104. Example audio alert devices include radios, intercoms, sirens and horns.

Figure 2:
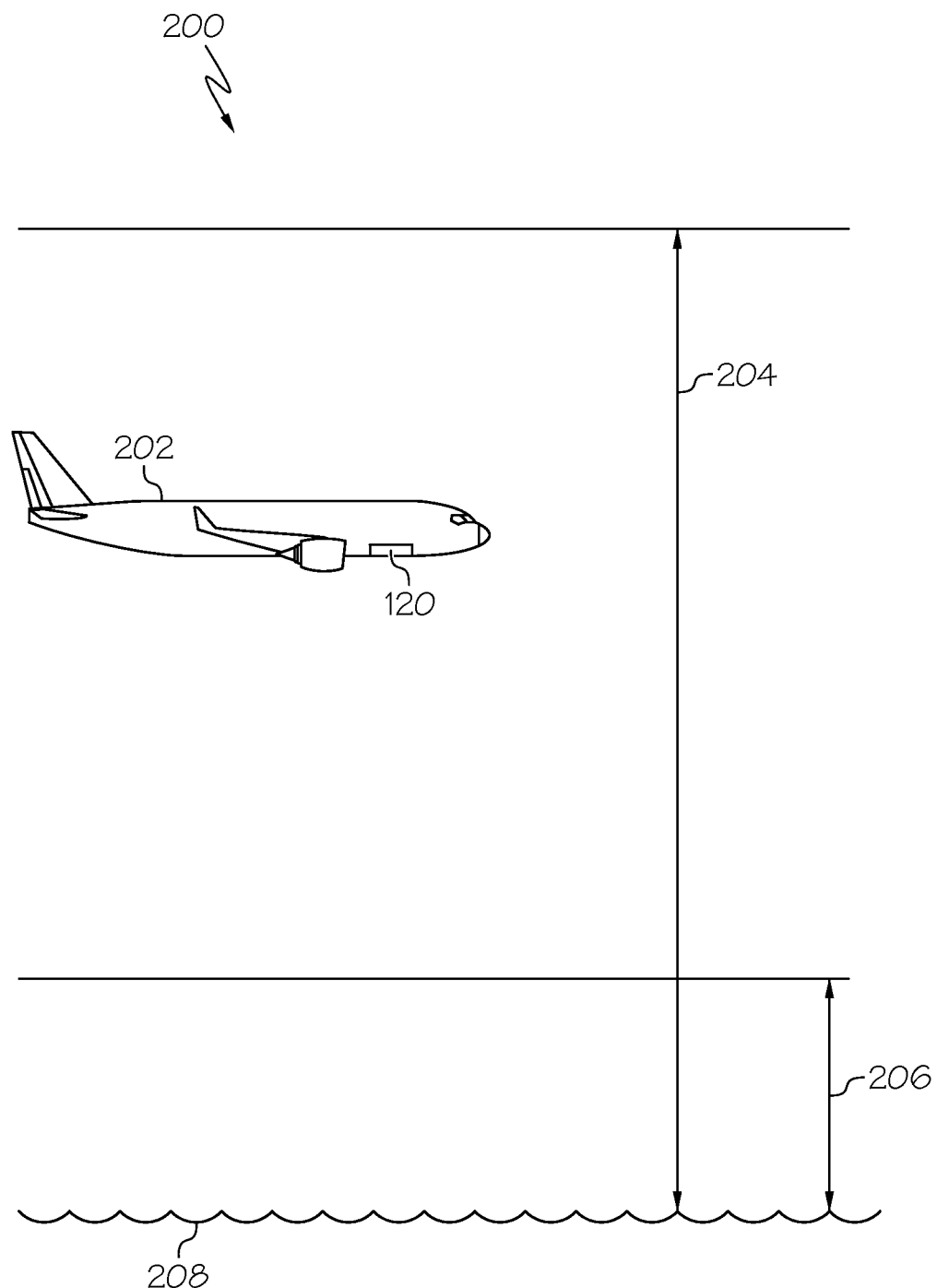
FIG. 2 is a simplified illustration of airspace showing an aircraft within an altitude band above the terrain according to the exemplary embodiment.

FIG. 2 is a simplified illustration of airspace 200 showing an aircraft 202 within an altitude band above the terrain 208 according to the exemplary embodiment. The altitude band is bounded by a predetermined maximum altitude 204 and a predetermined minimum altitude 206. Altitude information is generally obtained by one or more onboard radio altimeters 120 and supplied to the processor 102. The low airspeed warning system 100 uses altitude data in the generation of a threshold speed for a low airspeed warning.

The predetermined minimum altitude 206 is selected to represent an altitude beneath which the aircraft 202 is considered to be in a landing operation, and engine thrust is therefore expected to decrease. In the exemplary embodiment, the predetermined minimum altitude is substantially fifty feet, but may be within a range of thirty to one hundred. The predetermined maximum altitude 204 is selected to be the altitude above which traditional safety margin calculations are sufficient. In the exemplary embodiment, the predetermined maximum altitude is substantially three hundred feet, but may be within a range of three hundred to five hundred feet. As such, the exemplary embodiment identifies a predetermined altitude band from the predetermined minimum altitude 206 to the predetermined maximum altitude 204, inclusive (i.e., in the exemplary embodiment, 50 feet≤altitude≤300 feet), as benefitting from an increase in response time and safety margin. The predetermined minimum and maximum altitude used to define the predetermined altitude band may vary, and may be obtained via the user interface device 104, or may be preloaded into memory within processor 102.

As will be described in more detail hereinbelow, response time is related to the safety margin employed in the determination of the airspeed threshold for a low airspeed warning. In practice, the safety margin is realized as a scale factor used to modify a combination of the minimum operating speed and the stick shaker speed. Within the identified predetermined altitude band, the low airspeed warning system 100 compares engine thrust data to a predetermined minimum engine thrust and a predetermined maximum engine thrust. When engine thrust data is below the predetermined minimum engine thrust, the scale factor used is a first predetermined value. When engine thrust data is within an engine thrust band defined as the predetermined minimum engine thrust to the predetermined maximum engine thrust, inclusive, the exemplary embodiment generates the scale factor that changes based on engine thrust data.

Figure 3:
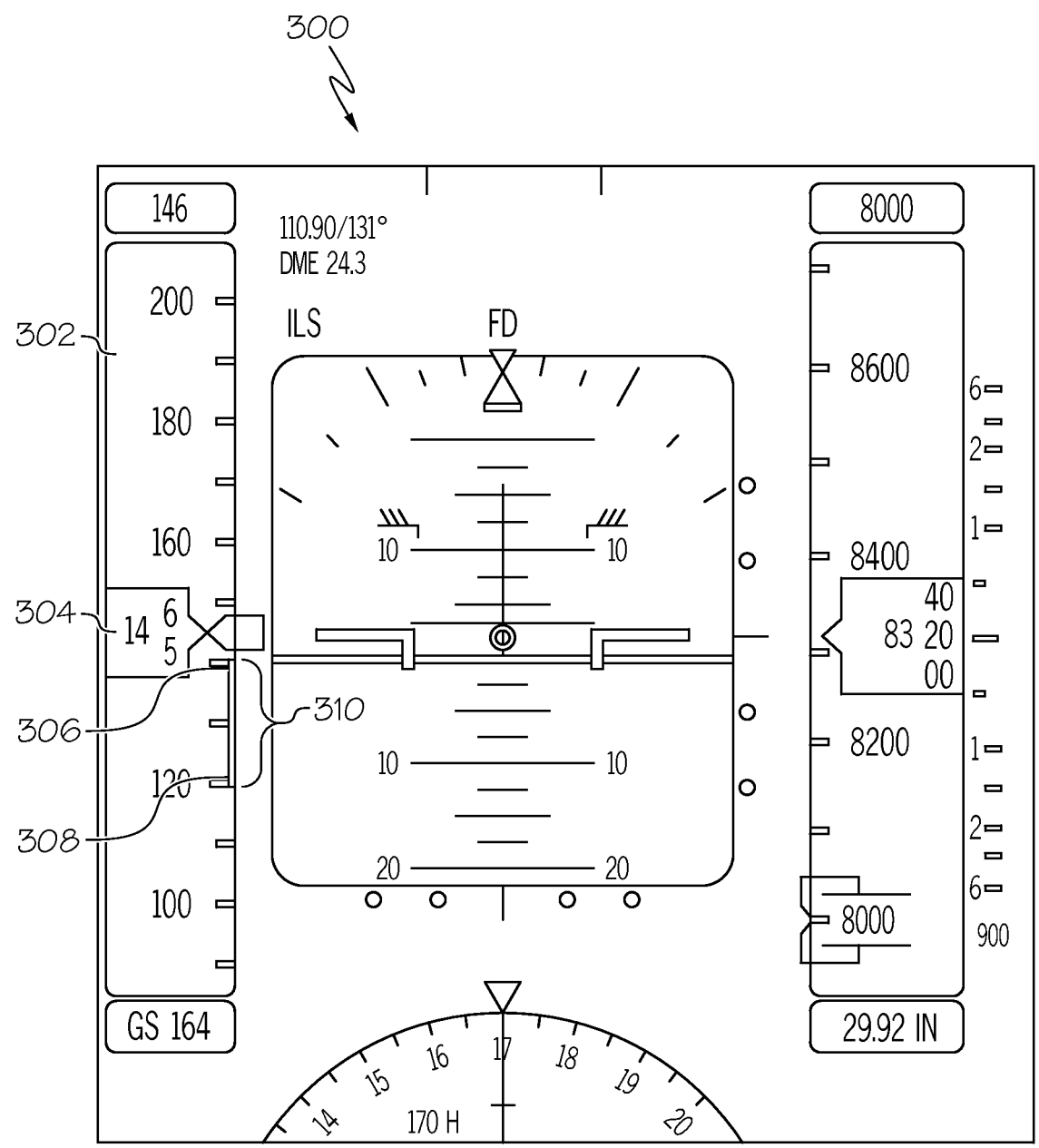
FIG. 3 illustrates a typical aircraft display graphic in accordance with an exemplary embodiment.

FIG. 3 illustrates a typical aircraft display graphic 300 in accordance with an exemplary embodiment. Aircraft display graphic 300 may be part of the primary flight display (PFD). In the exemplary embodiment, airspeed is displayed on the left, in a vertical box referred to as the speed tape 302. Airspeed units are knots (kt), or nautical miles per hour. A box is displayed around the current airspeed 304. Minimum operating speed 306 and stick shaker speed 308 define the upper and lower limits, respectively, of a visually distinguishable band 310 on the speed tape 302.

In some embodiments, the visually distinguishable band 310 may be referred to as the "amber band." During normal flight operations, aircraft 202 operates above the minimum operating speed 306, and therefore above the visually distinguishable band 310. Minimum operating speed 306 varies based on the stage of flight; for example, there may be different minimum operating speed 306 for takeoff initiation, takeoff climb, various en route, landing approaches, and the like; consequently, at any given time during operation of an aircraft, the location of the visually distinguishable band 310 on speed tape 302, and its range, in knots, may vary, as well as the associated cognitive workload. In spite of this variation, traditional aircraft warning systems employ only one, constant scale factor in the generation of low airspeed warnings.

Figure 4:
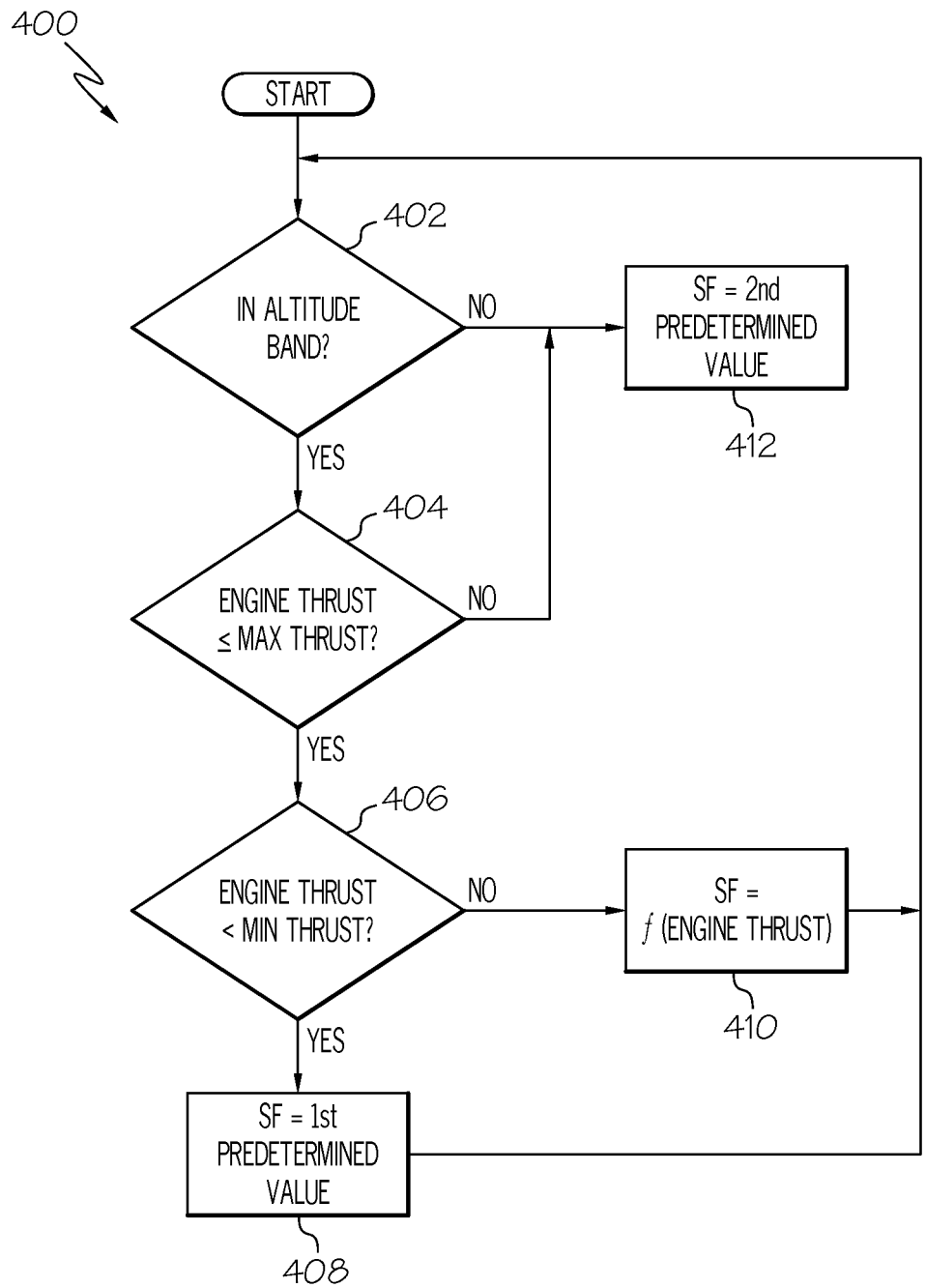
FIG. 4 is a flow chart describing steps of a low airspeed warning system process in accordance with an exemplary embodiment.

In accordance with an exemplary embodiment, the low airspeed warning system 100 takes the aforementioned variations into account as follows. FIG. 4 is a flow chart describing steps of a low airspeed warning system process 400 in accordance with the exemplary embodiment. Low airspeed warning system process 400 starts by comparing the aircraft altitude data with the predetermined minimum altitude 206 and predetermined maximum altitude 204, in order to identify whether the aircraft altitude data is within a targeted predetermined altitude band (STEP 402). At STEP 404, low airspeed warning system process 400 determines whether the engine thrust data is less than or equal to the predetermined maximum thrust, and at STEP 406, low airspeed warning system process 400 determines if the engine thrust data is less than the predetermined minimum thrust. In the exemplary embodiment, engine thrust data has the units of percentage, with an exemplary minimum thrust of substantially 30% and exemplary maximum thrust of substantially 50%. The values for minimum and maximum thrust may be adjusted for various aircraft and/or engine types. Thus, the combination of STEP 404 and STEP 406 identifies engine thrust data within a predetermined engine thrust band, defined as less than or equal to the maximum engine thrust and greater than or equal to the predetermined minimum thrust (i.e., in the exemplary embodiment, 30%≤engine thrust band≤50%). If the engine thrust data is within the predetermined engine thrust band, a variable scale factor that changes based on engine thrust data is generated (STEP 410) in accordance with equation (1).

$$SF = P2 + ((P1-P2)/(EMax-EMin))*(ET-EMin) \quad (1)$$

where:
SF=scale factor;
P1=first predetermined value, used for thrust below minimum thrust;
P2=second predetermined value, used outside of the altitude band and where thrust is above maximum thrust;
EMax=predetermined maximum thrust;
EMin=predetermined minimum thrust; and
ET=engine thrust data.

If the engine thrust data is less than the predetermined minimum thrust at STEP 406, then a first scale factor of a first predetermined value is generated at STEP 408, in accordance with equation (2).

$$SF = P1 \quad (2)$$

In the exemplary embodiment, the first predetermined value is substantially 1.5, or about two times larger than the second predetermined value. However variations in P1 and P2 may occur to accommodate for various aircraft types. For cases in which the aircraft is not within the predetermined altitude band (STEP 402), or the aircraft is within the predetermined altitude band but the engine thrust data is not within the predetermined engine thrust band, a second scale factor of a second predetermined value is generated at STEP 412, in accordance with equation (3).

$$SF = P2 \quad (3)$$

In the exemplary embodiment, predetermined value P2 is [INVENTORS, IS THERE A RANGE? PLEASE ADVISE] substantially 0.7, which is the constant scale factor utilized in the traditional aircraft warning systems, however some embodiments of low airspeed warning system 100 may utilize other values. Predetermined values, the range of the target altitude band, and the range of the engine thrust band may be entered into the user interface device 104, or may be preloaded into software within the processor 102.

Once the scale factor (SF) is determined, the scale factor is utilized in equation (4), below, to generate threshold airspeed.

$$TS = SS + SF*(MS-SS) \quad (4)$$

Where:
TS=threshold airspeed;
SS=stick shaker speed;
SF=scale factor; and
MS=minimum operating speed.

As can be seen by equation (4), the scale factor operates as a multiplier as applied to the difference between the minimum operating speed and the stick shaker speed, which is then added to the stick shaker speed. As such, the scale factor provides a safety margin above the stick shaker speed. It is to be noted that traditional aircraft warning systems also employ equation (4) in the generation of threshold airspeed; however, traditional aircraft warning systems are insensitive to the altitude data and engine thrust data, as is highlighted by their use of a scale factor of 0.7 in all scenarios.

Processor 102 uses the low airspeed threshold as a trigger to generate appropriate alerts on alert devices. Processor 102 continuously monitors altitude data, minimum operating speed, stick shaker speed, user input and engine thrust data, and updates threshold airspeed according to Equation (4). When the aircraft airspeed drops to the threshold airspeed for an aircraft operation, processor 102 generates appropriate commands to begin aural and visual warnings and alerts, and may generate commands to generate tactile alerts. In response to the commands, the various alert devices and instruments (for example visual alerts 116 and aural alert 118) within the low airspeed warning system 100 respond with aural and visual warnings and alerts, as described hereinabove.

The following example illustrates an improvement in safety margin (and hence, response time) provided by the proposed low airspeed threshold system 100 in low altitude situations. For example, if:
MS=minimum operating speed=118 knots;
SS=stick shaker speed=104 knots;
ET=engine thrust data=24%;
EMin=30%;
EMax=50%;
50 ft≤predetermined altitude band≤300 feet;
Altitude=250 feet;
P1=1.5; and
P2=0.7.

A traditional aircraft warning system employs a constant scale factor of 0.7 regardless of altitude data or engine thrust data, and would thereby generate a threshold airspeed (TS) as follows:

$$TS = 104 + 0.7*(118-104) = 114 \text{ knots} \quad (5)$$

Following the exemplary embodiment described in the flow chart of FIG. 4 above, it is first noted that the altitude data is within the predetermined altitude band, and the engine thrust data is below the predetermined minimum engine thrust. The associated scale factor is determined according to equation (2):

$$SF = 1.5 \quad (6)$$

The threshold airspeed (TS) is generated according to equation (4) as follows:

$$TS = 104 + 1.5*(118-104) = 125 \text{ knots} \quad (7)$$

In comparison, Equation (5) generates a threshold speed that is ten knots above the stick shaker speed and Equation (7) generates a threshold speed that is twenty-one knots above the stick shaker speed. Therefore, the exemplary embodiment of the low airspeed warning system 100 prompts the visual, aural and tactile devices eleven knots earlier than the traditional aircraft safety system. Consequently, the visible and aural warnings and alerts provided by the low airspeed threshold system 100 begin eleven knots earlier than in traditional aircraft safety systems. This difference in threshold airspeed is therefore manifested as an increase in response time (and hence, safety margin) provided by the proposed low airspeed threshold system 100 in low altitude situations.

Thus, there has been provided a method and system for determining an airspeed threshold for a low airspeed warning. The method generates a scale factor using altitude data and engine thrust data and applies that scale factor in the determination of an airspeed threshold for a low airspeed warning in low altitude situations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for generating a low airspeed warning in an aircraft, the method comprising:
   receiving engine thrust data;
   receiving aircraft altitude data;
   determining, in a processor, when the aircraft altitude is within a predetermined altitude band;
   and, when the aircraft altitude is within the predetermined altitude band, (i) determining, by the processor, a low airspeed threshold that is a function of engine thrust, and (ii) generating a low airspeed alert indicative of the low airspeed threshold,
   wherein generating a low airspeed alert comprises
   receiving, in the processor, a stick shaker speed;
   receiving, in the processor, a minimum operating speed; and
   determining, by the processor, when engine thrust is below a predetermined minimum thrust; and
   when engine thrust is below the predetermined minimum thrust, modifying a combination of the minimum operating speed and the stick shaker speed by a first scale factor equal to a first predetermined value.

2. The method of claim 1, wherein the predetermined altitude band is from about fifty feet to about three hundred feet.

3. The method of claim 1, wherein the predetermined minimum thrust is substantially thirty percent, and the first predetermined value is substantially 1.5.

4. The method of claim 1, wherein the alert is an aural alert.

5. The method of claim 1, wherein the step of generating further comprises:
   determining, by the processor, when engine thrust is within a predetermined engine thrust band; and
   creating, when engine thrust is within the predetermined engine thrust band, a variable scale factor based on a difference between the aircraft engine thrust data and a predetermined minimum thrust.

6. The method of claim 5, wherein the predetermined engine thrust band is from about thirty percent to about fifty percent.

7. The method of claim 5, further comprising:
   receiving, in the processor, a stick shaker speed;
   receiving, in the processor, a minimum operating speed; and
   modifying, with the variable scale factor, a combination of the minimum operating speed and the stick shaker speed.

8. The method of claim 1, further comprising generating a low airspeed threshold that is a function of a second predetermined value when the aircraft altitude is not in the predetermined altitude band, or if the aircraft is in the predetermined altitude band and engine thrust data is greater than a predetermined maximum thrust.

9. A method for generating a low airspeed warning in an aircraft, the method comprising:
   receiving engine thrust data;
   receiving aircraft altitude data;
   comparing the aircraft altitude to a predetermined altitude band;
   determining, in a processor, a variable scale factor that is a function of (i) aircraft altitude with respect to the predetermined altitude band and (ii) engine thrust;
   using the variable scale factor to determine a low airspeed threshold; and
   generating a low airspeed alert in response to the low airspeed threshold, wherein generating a low airspeed alert comprises
   receiving, in the processor, a stick shaker speed;
   receiving, in the processor, a minimum operating speed; and
   determining, by the processor, when engine thrust is below a predetermined minimum thrust; and
   when engine thrust is below the predetermined minimum thrust, modifying a combination of the minimum operating speed and the stick shaker speed by a first scale factor equal to a first predetermined value.

10. The method of claim 9, wherein the step of determining a variable scale factor comprises, when the aircraft is within the predetermined altitude band and the aircraft engine thrust data is within a predetermined engine thrust band, creating the variable scale factor as a function of engine thrust data.

11. The method of claim 9, wherein the step of determining a variable scale factor comprises creating the variable scale factor equal to a first predetermined value when the aircraft is within the predetermined altitude band and the aircraft engine thrust data is below the predetermined engine thrust band.

12. The method of claim 9, wherein the step of determining a variable scale factor comprises creating the variable scale factor equal to a second predetermined value when the aircraft is not within the predetermined altitude band or the aircraft is within the predetermined altitude band, but the aircraft engine thrust data is below the predetermined engine thrust band.

13. The method of claim 9, wherein the predetermined altitude band is from about fifty feet to about three hundred feet.

14. The method of claim 11, wherein the first predetermined value is substantially 1.5.

15. The method of claim 11, wherein creating a variable scale factor comprises subtracting a predetermined minimum thrust from the engine thrust data.

16. A system for generating a low airspeed warning in an aircraft, the system comprising:
   first source of engine thrust data;
   a second source of aircraft altitude data; and
   a processor coupled to the first source and to the second source, the processor configured to (1) receive engine thrust data and aircraft altitude data, (2) compare aircraft altitude to a predetermined altitude band, (3) determine a low airspeed threshold that varies as a function of aircraft altitude with respect to the predetermined altitude band and engine thrust data, and (3) generate a low airspeed alert in response to the low airspeed threshold; wherein the processor is further configured to
   receive a stick shaker speed;
   receive a minimum operating speed; and
   determine when engine thrust is below a predetermined minimum thrust; and
   when engine thrust is below the predetermined minimum thrust, modify a combination of the minimum operating speed and the stick shaker speed by a first scale factor equal to a first predetermined value.

17. The system of claim 16, wherein the processor is further configured to determine whether the aircraft is within a predetermined engine thrust band.

* * * * *